United States Patent

[11] 3,585,598

[72] Inventors William Jeffrey Hudson, Jr. Harrisburg; Michael Joseph Yaccino, Mechanicsburg; Edward Camp Dowling, Harrisburg; Keith Henry Dormer, Harrisburg, all of, Pa.

[21] Appl. No. 847,797
[22] Filed July 24, 1969
[45] Patented June 15, 1971
[73] Assignee AMP Incorporated Harrisburg, Pa.
Continuation of Ser. No. 593,966, Nov. 14, 1966, abandoned.

[54] ALPHANUMERIC, VARIABLE WORD LENGTH, CHANNEL SCANNING SELECTIVE SIGNALLING SYSTEM

14 Claims, 14 Drawing Figs.

[52] U.S. Cl. ........ 340/172.5
[51] Int. Cl. ........ G08b 11/00
[50] Field of Search ........ 340/286, 291, 408, 172.5, 311, 312, 313; 235/157; 179/2 DP

[56] References Cited

UNITED STATES PATENTS

| | | | |
|---|---|---|---|
| 3,300,763 | 1/1967 | Hoehmann | 340/172.5 |
| 3,344,401 | 9/1967 | MacDonald et al. | 340/172.5 |
| 3,351,919 | 11/1967 | Milford | 340/172.5 |
| 3,400,378 | 9/1968 | Smith et al. | 340/172.5 |
| 3,407,387 | 10/1968 | Looschen et al. | 340/172.5 |

*Primary Examiner*—Paul J. Henon
*Assistant Examiner*—Harvey E. Springborn
*Attorneys*—Curtis, Morris and Safford, Marshall M. Holcombe, William Hintze, William J. Keating, Frederick W. Raring, John R. Hopkins, Adrian J. La Rue and Jay L. Seitchik

ABSTRACT: A communication system for selective signalling between remote stations is disclosed which features an encoder capable of generating trains of binary bits representative of alphanumeric symbols and converting such bits into mark and space tones or signals for transmission. The encoder includes data register binary memory stages to temporarily store a calling code in serial bit form and logic is provided to permit recirculation of the code for redundant transmission. The encoder stages are coupled and driven to accommodate variable length calling codes with a character register controlled by a memory register to index the data register for such purpose. A receiver-decoder is provided to detect the transmitted mark-space code and convert such into a binary train in proper time relationship. The decoder includes a programmable input to a single eight stage register to generate a local code and Exclusive-OR logic to compare incoming detected code bits with generated code bits and provide a success detect output upon receipt of a proper code. The generation of a local code is used to provide an auto-acknowledge call from the receiver. The receiver includes circuit logic to optimize detection of proper codes and rejection of improper codes or spurious signals. A multichannel scanner is provided in conjunction with the receiver-decoder to automatically search for incoming codes on different channels and logic is provided to perform a number of output command functions responsive to a proper calling code.

| CHANNELS | TWO CHANNELS | | FOUR CHANNELS | | | SIX CHANNELS | | | | EIGHT CHANNELS | | | | |
|---|---|---|---|---|---|---|---|---|---|---|---|---|---|---|
| 1 | A-x | | A-x<br>$\bar{B}$-y | | | A-x<br>$\bar{B}$-y | | | | A-x<br>$\bar{B}$-y<br>$\bar{C}$-z | | | | |
| 2 | | $\bar{A}$-a | | $\bar{A}$-a<br>B-b | | | $\bar{A}$-a<br>B-b | | | | $\bar{A}$-a<br>B-b<br>$\bar{C}$-c | | | |
| 3 | | | | | A-d<br>B-e | | | A-d<br>B-e<br>$\bar{C}$-f | | | | A-d<br>B-e<br>$\bar{C}$-f | | |
| 4 | | | | | $\bar{A}$-g<br>$\bar{B}$-h | | | $\bar{A}$-g<br>$\bar{B}$-h<br>$\bar{C}$-i | | | | $\bar{A}$-g<br>$\bar{B}$-h<br>C-i | | |
| 5 | | | | | | | | | A-d<br>B-e<br>C-f | | | | A-d<br>$\bar{B}$-e<br>C-f | |
| 6 | | | | | | | | | $\bar{A}$-g<br>$\bar{B}$-h<br>$\bar{C}$-i | | | | $\bar{A}$-g<br>B-h<br>C-i | |
| 7 | | | | | | | | | | | | | | A-d<br>B-e<br>$\bar{C}$-f |
| 8 | | | | | | | | | | | | | | $\bar{A}$-g<br>$\bar{B}$-h<br>$\bar{C}$-i |
| SCANS | 4 TIMES | | 2 TIMES | | | 2 TIMES FOR 1 & 2<br>1 TIME FOR 3,4,5 & 6 | | | | 1 TIME | | | | |
| TOTAL DWELL TIME | 100 MSEC | | 50 MSEC | | | 50 MSEC FOR 1 & 2<br>25 MSEC FOR 3,4,5 & 6 | | | | 25 MSEC | | | | |

FIG. 10

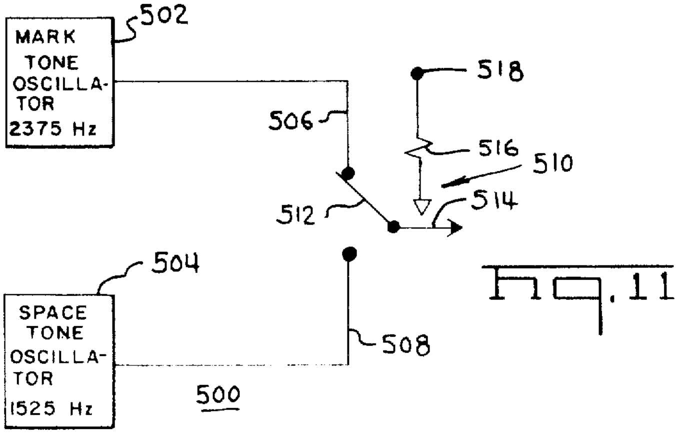

FIG. 11

ALPHANUMERIC, VARIABLE WORD LENGTH, CHANNEL SCANNING SELECTIVE SIGNALLING SYSTEM

This application is a continuation of our prior application, Ser. No. 593,966, filed Nov. 14, 1966.

BACKGROUND OF THE INVENTION

Most communication systems is use today have no selective signaling capability and require constant monitoring of audio broadcast bands. This means that an operator must be on duty at all times. It also means that signaling calls must be in audio or at code rates slow enough for an operator to understand the calling code. This places a severe restriction on the kinds of equipment which can be employed and on the code languages which can be used.

Most of the selective signaling systems which are in use today have a utility which is also quite limited due to having been developed for a very specific need as defined by the type and quantity of intelligence to be communicated; the type and range of transmission equipment employed, or, requirements of size, weight and packaging dictated by the environment of use. An example of this is found in a known personal paging system which employs combinations of five distinct tones transmitted from a master or base station to be received and detected by one of a number of receiver stations. In this type of system the receiver station need only be capable of detecting the existence of a pattern of tones and producing some output indicating that the station is being paged. It need not and would not be capable of responding to call signs which would include variably positioned alphanumeric bits; or of discriminating against calling codes having the same tone composition but, in addition, extra code tones for other purposes. It need not and would not be capable of scanning channels or of generating its own calling code for rebroadcast as an acknowledgement.

In summary, there is a present need for a general utility selective signaling system capable of use in all the various areas presently being served by a variety of different techniques.

SUMMARY OF THE INVENTION

This invention relates to a communication system for selective signalling between remote stations. The invention system is particularly adapted for marine, land-mobile and aeronautical use although it is contemplated that the system may be employed for remote signalling to control equipment for production, along pipe lines and in transmission networks and the like.

It is an object of the present invention to provide a selective signaling system which can encode and decode existing radio call signs without restriction on the use of various combinations of numbers, characters or symbols within the call sign.

It is a further object of the invention to provide a system which can selectively decode call signs of varying lengths without false calling.

It is yet a further object of the invention to provide a selective signaling system which is compatible with all mobile radio bands regardless of emission type or communication service.

It is still another object of the invention to provide a selective signaling system which is compatible with normal types of transmission equipment including land line, microwave and radio.

It is yet another object of the invention to provide a selective signaling system encoder capable of retransmitting a calling code manually or automatically as many times as it is desired without requiring a reentry input of the calling code.

It is still another object of the invention to provide a selective signaling system decoder capable of encoding its identity for rebroadcast and capable of post-address decoding any number of characters for channel designation, device control or other operations.

It is another object of the invention to provide a selective signaling system decoder which is readily changeable by the use of readily movable coding plugs to alter the code or different decoding stations.

It is still another object of the invention to provide a selective signaling system having a decoder circuit capable of automatic use or manual use for scanning and decoding calling signals on a plurality of channels.

The foregoing objectives are attained by providing a selective signaling system having an encoder which is capable of generating a train of binary bits defining address or routing characters and message characters to represent a wide variety of letters, numbers and other symbols along with post message and premessage control characters and converting such bits into distinct mark and space tones for transmission.

The encoder includes a data register for temporarily storing a calling code in serial bit form and includes logic to automatically output such code in mark-space form. A character register is provided to indicate the number of characters encoded and a character memory is provided to accommodate codes of varying length.

As a further aspect, the invention system contemplates a receiver-decoder capable of detecting the transmitted mark-space code and converting the content thereof back into a binary train; and, in proper phase or time relationship with the received and translated binary train, locally generating a binary train unique to a particular receiver station and then comparing on a bit-by-bit basis the generated and received trains simultaneously to produce an output if there is a comparison and no output if there is a lack of comparison. The receiver utilizes a single register which is caused to be driven in a sequence to produce different binary outputs for each character to be compared from a shift register which provides a series of signal outputs in proper phase relationship relative to the received code; which output is translated by pluggable coding elements into the proper binary code for each character. The system receiver includes an embodiment which provides a plurality of device control outputs for related or unrelated control functions; either simultaneously with the successful detection of a proper calling code or thereafter, responsive to follow-on message characters. The system receiver includes, in another embodiment, a circuit for automatic scanning of a variety of different receiver channels depending upon the condition of signaling in any one channel. This is accomplished through timing controls generated in a circuit in the receiver.

In the drawings:

FIG. 10 is a schedule showing connections for operation of the scanner of the system;

FIG. 11 is a schematic diagram of a circuit to provide tone outputs compatible with the system, responsive to various kinds of inputs.

In the description of the invention system to follow there will first be a detailed description of a typical signaling message format which is intended to outline system timing and functions. This will be followed by a detailed description of an encoder which first generates a calling code in a binary format and then translates such code into a mark-space waveform comprised of two distinct tones. Next, there will be a description of a receiver embodiment which translates the mark-space tones into a binary receiver code and which locally generates a binary code which is unique to a particular receiver station and then operates to compare the received code with the locally generated code to provide an indication of call. Various other embodiments of the system incorporated into the receiver for developing control signals and for scanning channels will be described therefollowing.

SIGNALING MESSAGE FORMAT

Figure 1:
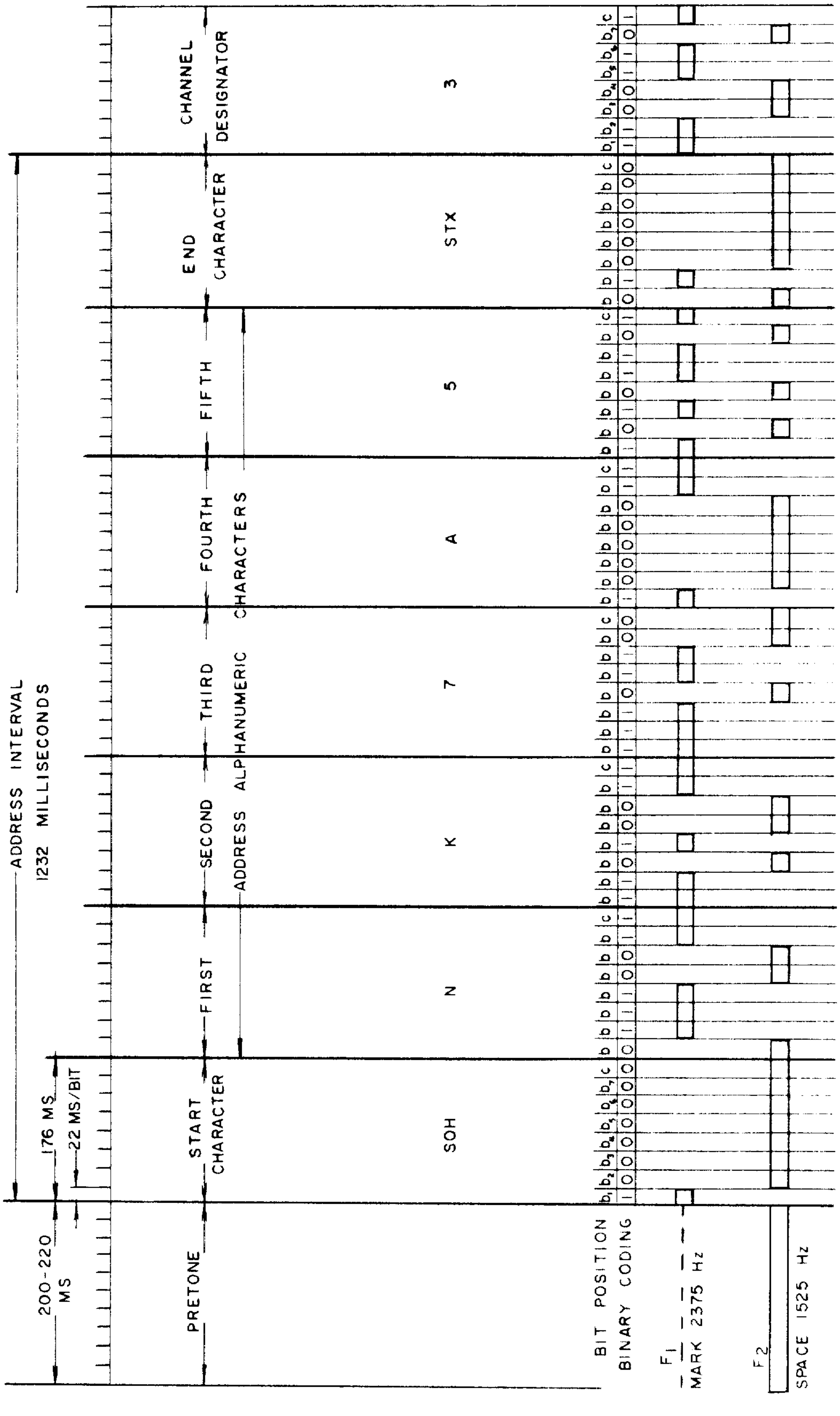
FIG. 1 is a time-sequence diagram showing a typical code composition in terms of binary bits and mark and space tones.

FIG. 1 shows a typical signaling message format. Reading from the left there is a first interval identified as a pretone interval which is represented as being approximately 200 to 220 milliseconds in duration. The pretone interval serves as a receiver attack time to allow for receiver equipment containing automatic gain control or automatic frequency control circuits to stabilize and also to permit multichannel scanning. Next, to the right of the pretone interval is a five digit address interval approximately 1232 milliseconds in duration. As can be seen the address interval is broken down into seven separate intervals each approximately 176 milliseconds long with each of the seven character intervals being comprised of eight 22 millisecond intervals for individual bit definition. To the left in the address interval, is a start character interval labeled SOH for start of heading. The SOH interval and the code therefor is utilized with every message to initiate timing signals in receiver equipment. As can be seen from FIG. 1, each of the characters is defined by binary ones and zeros in seven numbered bit positions labeled $b_1$ —$b_7$. An additional bit position labeled *c* is provided for each character interval for the purpose of providing parity, making the total of eight bit positions per character.

FIG. 1 shows the coding for the start character SOH relative to the seven bit positions and the parity bit position *c*. Following the start character are five intervals for the first, second, third, fourth and fifth alphanumeric characters utilized in the address interval. Each of the alphanumeric character intervals contains seven bit positions for for binary coding with an eighth position for parity like that of the start character. The binary coding for a typical alphanumeric address of NK7A5 is as shown in FIG. 1. The address interval is completed by a seventh interval which is the end of address character, STX. The character STX is always used in the message format and serves to develop control signals in the receiver. Following the full address interval is a further interval for channel designation, device control or for data for telex, teletype or other uses. The representative follow-on character is shown as 3 in FIG. 1.

The lower part of FIG. 1 depicts the mark-space code which is utilized for driving transmission equipment. As will be apparent from FIG. 1 the mark tone $F_1$ is of a distinct frequency of 2375 Hz. and the space tone $F_2$ is 1525 Hz.

The representation in FIG. 1 for the tones $F_1$ and $F_2$ may be thought of a burst of frequencies within the blocks actually represented.

A nonreturn-to-zero type keying is employed in order to maximize the data transmission rate possible with a 45 baud signalling rate which permits signaling over leased lines at what is believed to be the maximum message rate expected for use with a system having general utility.

As can be see in FIG. 1, in the pretone interval, the space tone $F_2$ is held on constantly and the mark tone is off. During the address interval and the follow-on interval the mark tone $F_1$ is brought on each time there is a one in a bit position and the space tone $F_2$ is brought on each time there is a zero in a bit position.

As will be made apparent hereinafter the above message format can be shortened by merely utilizing fewer of the five alphanumeric characters and by adding STX immediately following the last alphanumeric character employed. The system of the invention will readily accommodate messages such as STX NK STX, STX NK 7 STX and the like.

It is contemplated that the system can be expanded by the addition of stages therein to accommodate a larger address interval than that depicted. It is believed however, that the use of a seven character address interval is quite adequate to handle all of the symbols presently necessary for addressing and communicating purposes through out the world. A seven bit character code can accommodate 128 distinct symbols. A typical listing of the symbols which may be developed by a code of this type may be found in the CCITT Alphabet No. 5 for data transmission and telegraphy.

ENCODER

Figure 2A:
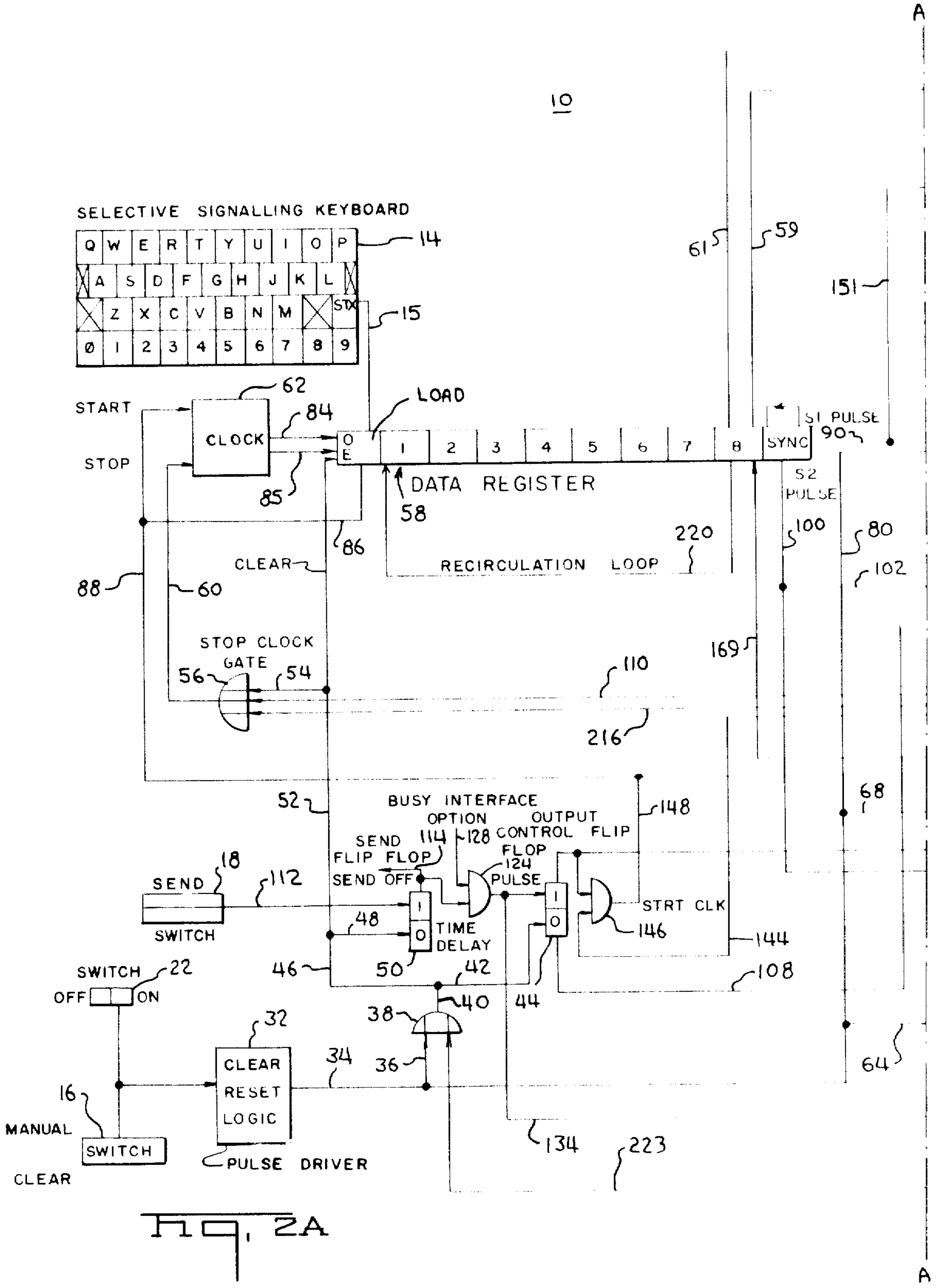
FIGS. 2A and 2B are schematic diagrams showing an encoder circuit.
Figure 2B:
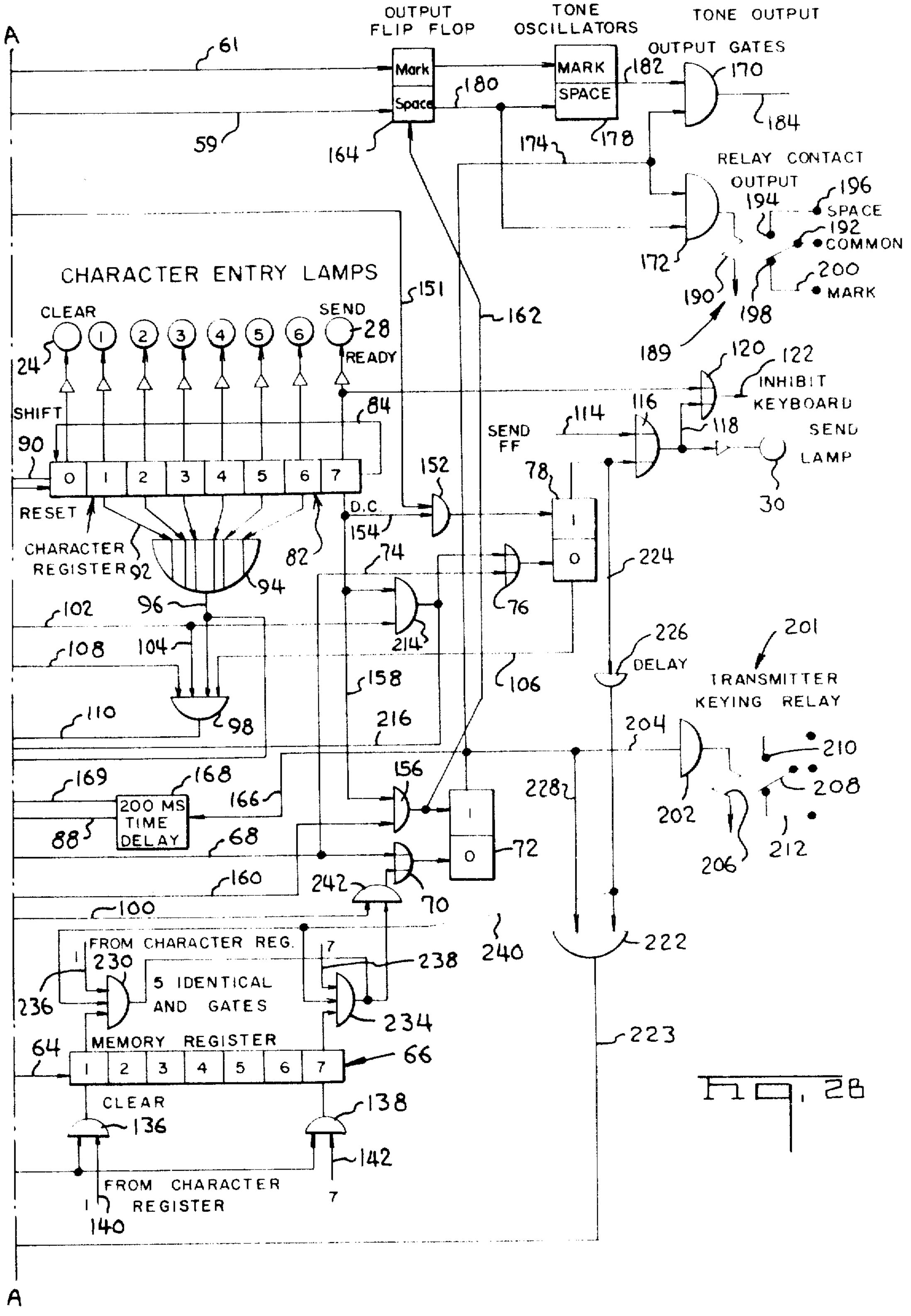

Referring to FIGS. 2A and 2B, the master encoder circuit of a system of the invention will now be described. The master encoder is housed in a console, not shown, about the size of an electronic desk top calculator and contains keyboard 14 having a number of individual pushbuttons associated with the various characters used in the system. A series of switches are provided including a manual clear switch 16 and a send switch 18 shown to the lower left of FIG. 2A. These switches are driven by the pushbuttons located on the face of the console. The console contains a power switch 22 and a series of lamps including a clear lamp 24, shown in the upper right-hand side of FIG. 2B, which indicates that the master encoder is prepared for data input; and, character entry lamps 26, which indicate the number of characters that are stored in the master encoder. The console also includes a send ready lamp 28, to the right of the lamps 26, which indicates that the master encoder is either completely loaded with characters or is ready for a send cycle. A lamp 30, to the right of FIG. 2B, serves as a send lamp to indicate that the master encoder is in the midst of a send cycle.

These various elements permit a user to manipulate the master encoder to develop a signalling message format of the type heretofore described relative to FIG. 1. FIGS. 2A and 2B together show that the master encoder circuit diagram including the various other components and connections between components necessary to generate the message format heretofore described.

As a preliminary phase of operation of the master encoder the elements thereof are driven through what is termed a clear/reset cycle. The clear/reset cycle is initiated whenever the power switch 22 is turned on; or, if 22 is already on, whenever the manual clear switch 16 is operated.

As will be apparent from FIG. 2A, the elements 16 and 22 are connected by a lead to a clear/reset driver 32, which is a standard pulse driver capable of producing a pulse sufficient to drive a substantial number of elements. The driver 32 has an output lead 34 which operates to connect a pulse from 32 simultaneously to a number of components as shown in FIGS. 2A and 2B. The first component, connected by a lead 36, is a standard OR gate 38 which has an output 40 connected to a lead 42 which operates to set an output control flip-flop 44 to the condition shown in FIG. 2A. Lead 40 is also connected to further leads 46 and 48, which supplies the output from 38 to set a send flip-flop 50 to the initial condition as shown in FIG. 2A. Lead 46 is also connected to a lead 52 which operates to connect the output from 38 to a stop input to a clock OR gate 56 via an OR gate input lead 54. The pulse on lead 52 further operates to clear a data register shown as 58. The data register includes bistable stages in number sufficient to accommodate the bits of the code shown in FIG. 1. An output from OR gate 56 via lead 60 is connected to the circuit clock 62; an impulse on 60 operating to stop clock 62.

The lead 34 from the clear/reset driver 32 is also connected via lead 64 to supply a clearing pulse to a seven bistable stage memory register shown as 66 in the lower right part of FIG. 2B. Lead 34 is also connected via a lead 68, (middle of FIG. 2B) to an OR gate shown as 70, which operates responsive to a pulse input to set the flip-flop shown as 72 to an initial condition as represented in FIG. 2B. The lead 68 is also connected in FIG. 2B to a further lead 74 in turn connected to an OR gate 76 operable to set the flip-flop shown as 78 to an initial condition as indicated in FIG. 2B.

The lead 34 is connected via a lead 80 in FIG. 2A to an eight bistable stage character register 82 in FIG. 2B to supply a clearing pulse thereto to preset the character register to a clear condition which is defined by the presence of a binary 1 in the 0 stage thereof and by binary 0s in the succeeding stages numbered 1 through 7. Each of the stages of the character register 82 have an output lead therefrom to lamps shown thereabove which are connected to be driven to represent the binary condition of the stages of 82. In an initial reset condition for the encoder circuit 10, the lamp 24 will be lighted to indicate a clear condition and the lamps 1—6 and the send ready lamp 28 will be extinguished to indicate that no characters are entered in 82.

Assuming now that the system encoder circuit 10 is in the clear condition, the encoder may be loaded by selectively depressing the character buttons in the keyboard 14. For the representative code depicted in FIG. 1, the keys associated with the symbols NK7A5 would be depressed. Following the loading of the address characters, the STX key would be depressed to insert the stop code character. The reason that the stop character is manually is because the encoder must be able to handle addresses of varying lengths, and before any control character, such as the control character 3 depicted in FIG. 1, is loaded. Following depression of the STX key key the selected control character such as 3 is depressed to insert the control character.

A preferred embodiment for injecting bits into 58 by the depression of keys in a keyboard is taught in U.S. application Ser. No. 565,624 filed June 15, 1966 in the name of Edward Camp Dowling, et al. Briefly summarized, the data register is in accordance with a preferred embodiment made to include eight bit positions for the load stage and for each of the eight numbered stages and a SYNC stage. Each bit position may be thought of as a flip-flop or as a pair of multiaperture cores coupled together for serial transfer and coupled to be driven by an advance odd-even advance drive, well known in the art. The clock 62 supplies this advance drive and is capable, when started, of producing alternate pulses on the leads shown as 84 and 85 which are respectively odd and even drive windings for 58.

In accordance with the invention each of the keys in 14 is connected to a set of contacts to energize a lead such as 15 which is connected in a pattern through the eight bit positions in the load stage of 58 so as to set certain of the bit positions and clear others to define a binary pattern in such stage. For example, relative to the first character of the message format under consideration which is the character N, depression of the N key in 14 would impulse the load stage to effect a binary code 01110011. See the bit positions $b_1$—$b_7$ for $c$ for N in FIG. 1. As soon as the load stage has been fully loaded an output from the load stage is provided via lead 86 connected to the lead shown as 88 which goes to the start input terminal of clock 62 to cause the clock to operate to produce pulses on leads 84 and 85 and drive the binary code in the load stage along the data register. As the clock 62 shifts the bits in the load stage into the stage numbered 1, the drive pulses will also drive the SYNC stage. The SYNC stage contains a single 1 bit at all times which circulates under drive from 62. At the end of seven and one-half advance strokes, the 1 bit will produce an output on the lead shown as 90. This output is known as the S1 pulse and is supplied to the character register 82 to cause the 1 stored in the 0 stage to be transferred to the position 1 stage of 82. This will cause the character entry lamp number 1 connected to the position 1 stage of 82 to be lighted, indicating that one character has been loaded into the encoder circuit. There is an additional output from position 1 via a lead 92 to an OR gate 94 which is accordingly enabled to provide an output via a lead 96 to an AND gate 98. The AND gate 98 also has an input via leads 100, 102 and 104, developed by the bit in the SYNC stage of 58 arriving in the eighth bit position to produce what is known as an S2 pulse. This will produce a pulse on lead 110, from 98 through the OR gate 56 the lead 60 to stop the clock.

This operation will have advanced the character loaded into the data register 58 into the position numbered 1 and will have advanced the one stored in the 0 position of the character register into the position numbered 1, extinguishing the clear lamp and lightning the lamp numbered 1 above the character register.

Subsequent depression of keys in 14 will repeat the above logical cycle.

After the encoder has been fully loaded it is operated in a send cycle which shifts the previously stored data in the data register 58 to output logic with transmission equipment being automatically keyed and the keyboard being simultaneously inhibited from further data entry. The send cycle of the encoder may be initiated by an operator when the data register is only partially loaded, or when the data register is completely loaded.

Turning first to the partially loaded condition wherein the data register 58 contains from one to six characters. When the send switch 18 is energized by depression of the send pushbutton a pulse is produced via a lead 112 to the send flip-flop 50 shown in FIG, 2A, which is et to enable an OR gate 116, shown to the set in FIG. 2B, via lead 114. This turns on the send lamp 30 and also produces an output via lead 118 to a further OR gate 120 which produces a pulse on the lead 122 to interrupt the power supply to the keyboard and thereby inhibit the keyboard from inputting information into the data register 58. Setting of relay 50 also impulses a time delay AND gate shown as 124. The gate 124 is of a type which will produce an output in response to an input on both input terminals thereto even though there is a delay in the occurrence of such inputs. A second input to gate 124 is developed via lead 128 which is connected to a busy interface unit not shown but understood to produce a signal to 124 if transmission equipment associated with the system is not busy. This is advisable if the system is made to contain a plurality of encoders which share the same transmission equipment.

Assuming that gate 124 is energized it will produce a pulse output to set output control flip-flop 44 shown in FIG. 2A. The pulse from gate 124 is also connected via lead 134 to a plurality of AND gates two being shown as 136 and 138 (in the lower portion of FIG. 2B), which are connected to individual stages in memory register 66. The memory register 66 includes some seven stages which may be comprised of a flip-flop or a magnetic core capable of being driven into distinct 1 or 0 binary conditions. Each of the gates such as 136 and 138 includes separate additional inputs, 140 and 142 connected to the respective numbered stages of the character register 82. Lead 140 would therefore be connected to the stage numbered 1 in the character register 82 to provide an input to 136 at any time when the stage numbered 1 in the character register contains a binary 1. An input from the character register to one of the gates 136 and 138 will enable the gate and an input on lead 134 will thereafter cause one of the stages in the memory register to be set depending on the setting of the stages in the character register. Thus, if five characters have been loaded into the master encoder so that the character register stage 5 is energized and the lamp 5 is turned on, the memory register position 5 would be energized. The memory register is utilized to keep the data register 58 and the character register 82 synchronized notwithstanding a variation in the length of messages.

The presence of a character in state 5 of the character register 82 will provide an input to the OR gate 94 which in turn will provide an input to the AND gate 146, in FIG. 2A, via lead 144. The AND gate 146, having been enabled by the setting of flip-flop 44 will produce an output via lead 148 to the lead 88 which will start clock 62. The clock 62 then provides advance shift pulses to shift the data in data register 58. The character register 82 is also caused to be advanced by an output on lead 90 and the clock is caused to run until the bit in 82 reaches the stage numbered 7. The gate 98 does not operate to stop the clock because the flip-flop 44 is in the state shown in FIG. 2A. When stage 7 in the character register 82 is energized the send ready lamp 28 is lighted and the OR gate 120, to the right in FIG. 2B, is enabled to inhibit the keyboard as described.

The character register 82 is driven only by trailing edge of the S1 pulse and therefore the AND gate 152 connected via 151 and lead 90 is not enabled by the lead connection 154 from the stage 7 of 82. An AND gate shown as 156 is, however, enabled via lead 158 from stage 7 and is driven by an input from flip-flop 44 via lead 160. This operates to set a flip-flop 72, in FIG. 2B and, via lead 162, to set an output flip-flop 164 into the space condition. When the flip-flop 72 is set it produces an output via lead 166 which starts a 200 millisecond time delay element shown as 168 in the left center of FIG. 2B. It also enables a plurality of output AND gates shown as 170 and 172 via lead 174 at the top right of FIG. 2B. When the output AND gates are enabled the flip-flop 164 will drive a tone oscillator, shown as 178 via a lead 180, to produce a space output signal of 1,525 Hz. on an output lead 182 to the output gate 170. This will in turn produce an output from the encoder to transmission equipment via the output bus 184 to develop the pretone interval of 200 milliseconds of space tone shown in FIG. 1.

In accordance with the invention system, two types of outputs are provided. The output on 184 is a tone output driven directly by the tone oscillator 178. Energization of the space half of the flip-flop 164 also serves to drive and the AND gate 172, which has been enabled by flip-flop 72 via lead 174. The signal input to 172 will produce a current energizing an output relay 189 via the coil shown as 190, which will drive the contact arm 192 thereof connected to some suitable current source to engage the space contact shown as 194. This will produce a current output on the space lead 196. Deenergization of the coil 190, upon 164 being driven to the mark condition will cause the contact 192 arm to be driven to the position shown engaging the mark terminal 198 to produce an output on the mark lead shown as 200.

The invention encoder therefore may be used with transmission equipment requiring tone inputs and/or with transmission equipment requiring relay-type inputs.

Energization of the flip-flop 72 also energizes a transmitter keying relay 201 through a gate 202, in FIG. 2B, via the lead 204. The transmitter keying relay includes a coil 206 operable to drive a contact arm 208 between terminals 210 and 212 associated with the space and mark. During the 200 millisecond time delay the space tone, the space contact and the transmitter keying contacts are energized.

When a pulse output occurs on lead 100, in FIG. 2A right center, due to the S2 pulse, an AND gate shown as 214, in the center of FIG. 2B, will be enabled via the lead 102. This will operate via a lead 216 to energize the OR gate 76 to insure that the flip-flop 78 has been reset.

At the end of the 200 millisecond time delay the start character SOH is loaded in position 8 of the data register 58 by an impulse provided from delay element 168 on lead 169. Also, the clock is energized from 168 via lead 88 to shift data from stage numbered 8 via leads 59 and 61 to the output flip-flop 164, which then is driven to switch from space to mark, depending upon the code and data being outputted from 58. There is provided a recirculation loop shown as 220, which feeds outputs from stage numbered 8 in the data register back to position 1.

Outputs from the output flip-flop 164 operate the tone oscillators in 178 to produce the appropriate tones for transmission and, since the relay contact outputs 172 and 202 have been enabled, both tone and contact outputs are sent.

Meanwhile, at the end of the start character the SYNC stage in 58 will have produced another S1 pulse on lead 90 to operate flip-flop 78 through the previously enabled AND gate 152. When flip-flop 78 is operated it will set a previously enabled AND gate 222 connected via a lead 224 to the output from flip-flop 78 through a delay element 226. The AND gate 222 is enabled by an input from the flip-flop 72, via a lead 228. When flip-flop 78 is set it also produces an output to disable the AND gate 98 and turn on the send lamp 30 through the connection from the OR gate 116 which also includes a connection to the inhibit gate 120, which inhibits the keyboard. The data register 58 and the character register 82 will continue to operate until the register positions are identical. When the two positions are identical, an output will be provided from one of the previously enabled AND gates shown as 230. These gates are connected to the various stages of the memory register, via leads as shown and are also connected to the stages of the character register by leads indicated as 236 and 238; and further connected to the AND gate 222 by the lead 240. The flip-flop 72 is reset by an output from one of the gates 230—234 through and OR gate 70 from an AND gate 242 connected to produce an output in response to an S2 pulse and 230—234. When flip-flop 72 has been reset it will disable the output gates 170 and 172 and the transmitter keying relay gate 202.

The data register 58 and the character register 82 will still continue to shift until the character register contains a bit in position number 7. When this occurs and an S2 pulse occurs, the AND gate 214 is enabled to provide a pulse on lead 216 to stop the clock and reset the flip-flop 78 to extinguish the send lamp 30.

The master encoder is now prepared for initiation of a repeat send cycle. At this time the keyboard at 14 is still inhibited from the gate 120 and the memory register 66 still retains the position data. The character and data register, are at this time, set for sending. Depression of a pushbutton associated with the send switch 18 will cause the system encoder to recycle. If desired, the send switch may be enabled by separate means, not shown, to repetitively cycle as many times as desired to produce code outputs repetitively.

If the data register had been fully loaded with seven characters, there would have been a bit in the position 7 and the send ready lamp would have been lighted. The keyboard would have been inhibited through the element 120 and depression of a button associated with the send switch 18 would have caused all the previously discussed logical cycles to begin with the setting of the flip-flop 72.

Before a different code can be sent it is necessary to initiate the clear cycle by operating the manual clear switch 16 to clear out the circuit as heretofore described.

We may now assume that a code like that discussed relative to FIG. 1 has been generated and sent in the tone format shown in FIG. 1.

DECODER

Figure 3A:
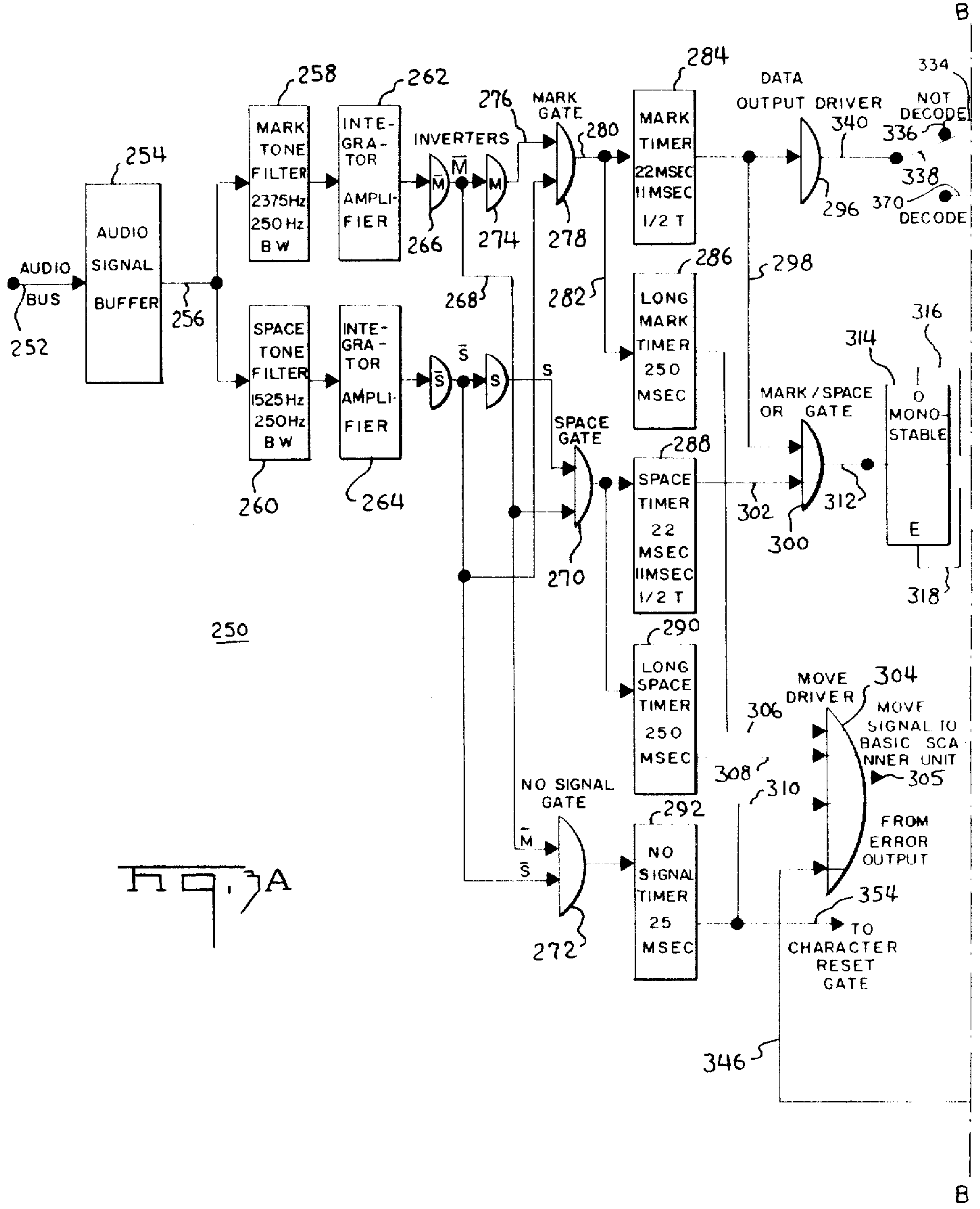
FIGS. 3A and 3B are schematic diagrams showing a receiver decoder circuit.
Figure 3B:
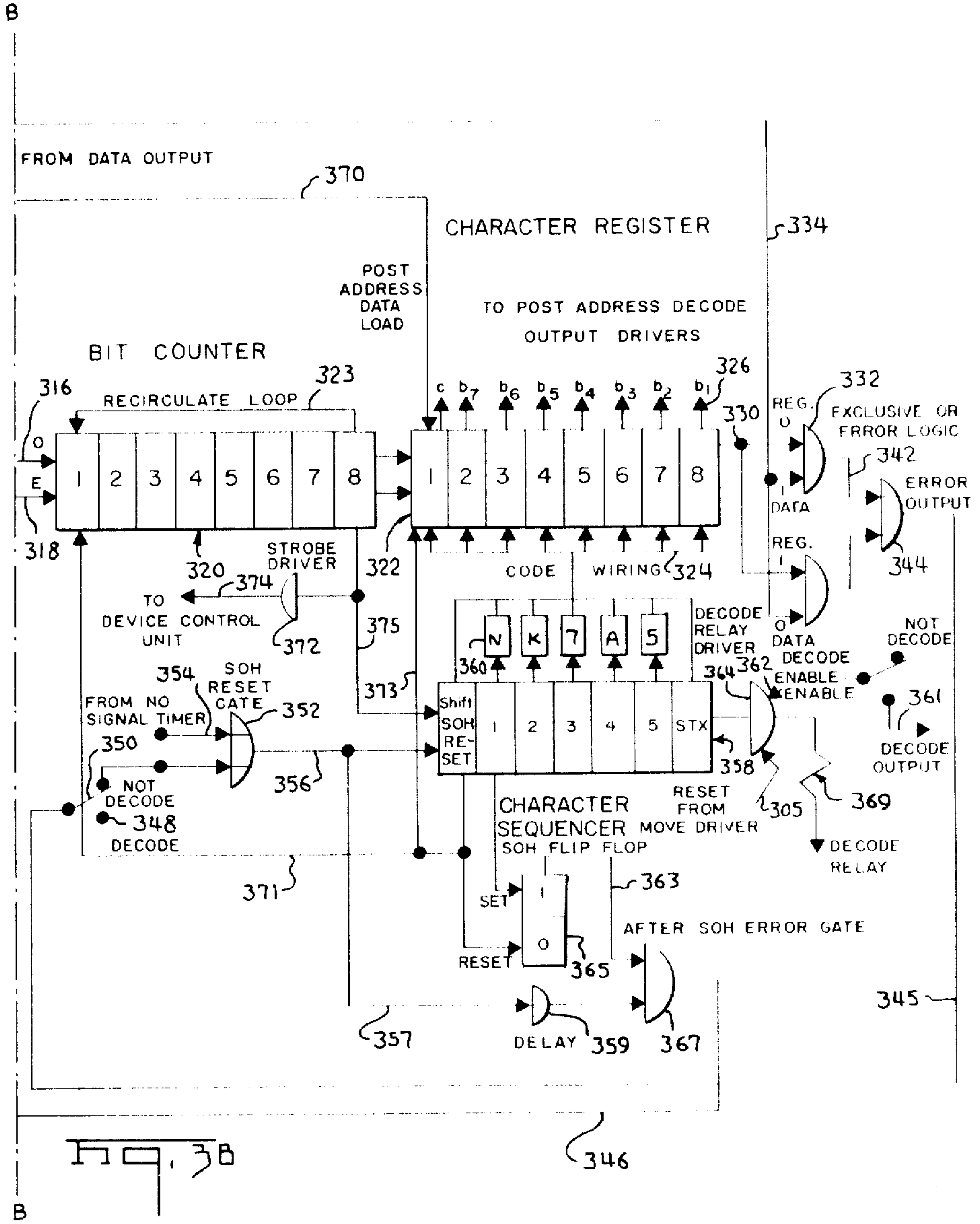

Turning now to FIGS. 3A and 3B, a receiver decoder circuit for the system of the invention is shown as 250. The transmitted code, having a composition heretofore described, is received by suitable receiver equipment, not shown, and supplied via an audiobus input 252. The audiobus supplies an audio signal buffer 254 which is a standard transformer and matching network capable of providing the kind of signals required by the components of 250. An output on lead 256 from 254 is made to supply parallel paths, including, at the top, a mark tone filter 258 and, at the bottom, a space tone filter 260. The tone filters are of a standard type capable of passing a band width of approximately 250 hertz and each is centered on the frequencies of 2,375 hertz, respectively and 1,525 hertz. Outputs from the tone filters are supplied to identical integrator amplifiers shown as 262 and 264. These units serve to amplify, rectify, filter and square up the pulses from the tone filters to provide mark and space pulses to the rest of the circuit.

Connected to each integrator amplifier is an inverter circuit which provides certain logic inputs to the remainder of the circuit. Thus, with respect to the mark path, there is provided a first inverter shown as 266 and otherwise labeled $\overline{M}$ to indicate that when there is a mark input 266 provides no output and when there is no mark input 266 provides an output. A lead from the output of 266, shown as 268, is coupled to a space AND gate 270 and to a no-signal gate 272. The output of 266 is also connected to a further inverter 274, otherwise labeled M, which produces a signal which is the reverse of the signal supplied by 266; i.e., a mark tone output when there is no output from 266, which means that there is an output from 262. The inverter 274 is connected by a lead 276 to a mark gate 278.

The integrator amplifier 264 connected in the space tone path is similarly connected to a pair of inverters for producing logically opposite signals for space and nonspace tone conditions. These are shown as $\overline{S}$ and S connected by leads to the mark, space and no-signal AND gates. The mark AND gate 278 is enabled only when it receives both M and $\overline{S}$ and produces an output via the leads 280 and 282 to a pair of timers. These timers are shown as a mark timer 284 and the long mark timer 286. The space gate 270 is similarly connected to a space timer 288 and a long space timer 290. The no-signal gate 272 is connected to a no-signal timer 292.

The mark and space timers are drivers capable of producing output pulses only after the presence of an input signal for 11 milliseconds. After 11 milliseconds, these units will continue to generate pulses every 22 milliseconds as long as an input signal is present. The no-signal gate 272 is operated by the absence of mark and space signals for more than 25 milliseconds to produce an enabling output pulse.

The long mark timer and the long space timer generate output signals in the event that inputs thereto exist for longer than 250 milliseconds; e.g., in the event that there is a mark signal from 278 longer than 250 milliseconds the long mark timer 286 will produce an output pulse.

The mark, space and no no-signal perform a logic function which has been found to greatly enhance the reliability of the system by eliminating certain considerations of signalling conditions which sometimes occur. These conditions may result from spurious signals developed from atmospheric conditions, RFI, passing aircraft or any one of a number of influences. The long mark timer 286 serves to prevent any continuous and illegitimate mark signal over 250 milliseconds from blocking the receiver from operation to scan for other channels, and the long space timer 290 operates similarly with respect to space signals greater than 250 milliseconds. The no-signal timer 292 causes the receiver to be reset every 25 milliseconds if no signal occurs. This also operates a scanner in the system to cause the receiver to look at other receiver channels. The mark and the space timers 284 and 288 operate as described, only after an input for 11 milliseconds. This eliminates spurious pulses which are too short to be legitimate. The mark and space logic including the inverters M, $\overline{M}$, S and $\overline{S}$ increase reliability by assuring that a spurious signal containing both mark and space signals simultaneously will not cause the system to respond.

The mark timer is connected to a data output driver shown as 296 and also via a lead 298 to a mark-space OR gate shown as 300. The gate 300 is also supplied with an input via lead 302 from the space timer 288. There is provided a move driver 304 which is supplied by inputs from 286, 290 and 292 via leads 306, 308 and 310. The move driver 304 is an OR gate capable of providing a signal via 305 to a scanner unit to be described hereinafter.

The mark-space OR gate 300 is connected via lead 312 to a monostable pulse driver shown as 314, which is capable of producing output pulses on the separate odd and even leads shown as 316 and 318 and otherwise labeled 0 and E. These leads supply drive pulses to a bit counter 320 shown in FIG. 3B connected in series to a character register 322. The bit counter is a standard bistable stage shift register having eight stages with the eighth stage coupled to the first stage by a recirculating loop shown as 323 so that a single one advanced by 314 will step through each of the numbered stages and will then be recirculated from the eighth stage back into the first stage.

The character register 322 is comprised of eight bistable stage devices adapted to be set into binary 1 or 0 conditions by eight separate inputs indicated as 324 and operable to produce eight separate outputs shown as 326, which represent the bits $c$ and $b_1$ and $b_7$. These outputs are connected in parallel to a post-address decode output circuit shown in FIG. 4 and discussed hereafter. The character register also has a single serial output at 330 which will produce the bits $b_1$—$b_7$ and $c$ as a train of binary pulses responsive to 0 and E drive monostable 314 via counter 320. The character register 322, it will be noted, has a capability of only one character.

The serial output from 322 via 330 is connected to an Exclusive-Or logic gate 332. There is a second input to 332 from a lead shown as 334 at the top of FIG. 3B, which is connected through a switch shown as 336 in FIG. 3A via a contact arm 338, terminated to a lead 340 and the data output driver 296. The incoming code from the master encoder is supplied via 296 to 332. The Exclusive-OR logic gate is of a standard construction made to supply an output only when inputs thereto are dissimilar; i.e., binary 0 and binary 1, or binary 1 and binary 0. As long as the inputs are the same the Exclusive-OR gate 332 will produce no output.

The output lead from 332 shown as 342 is connected to an error output OR gate 344, which is connected via lead 345 through a switch 348 (to the left of FIG. 3B) having a contact arm 350 positioned during a receive cycle to supply an input to an SOH reset OR gate 352. The gate 352 also has an input shown as 354 from the no-signal timer 292.

An output from 352 is supplied via lead 356 and 357 to a delay element 359 and then to an error AND gate 367. The delay is provided in order to permit 367 to receive an input via 363 from an SOH flip-flop 365. In the event of an error output from the Exclusive-OR 332, the SOH reset gate 354 will reset 358 to provide a reset pulse to 365 from the SOH stage.

An output from 367 is connected via lead 346 back to the move driver 304 to cause the scanner of the system to move to another channel, the receiver circuit 250 operating again to look for a proper code. An output from the SOH stage is also connected via a lead 371 to reset the bit counter 320.

The gate 352 has an output 356 connected to the character sequencer 358. The character sequencer is a seven bit shift register having seven bistable stages therein each of which is connected in parallel to the character register 322. The sequencer normally is set with a 1 bit in the first stage with the other stages being cleared. The first stage is reserved for the SOH character and the last stage is reserved for the STX character. The SOH and STX stages produce outputs to set the stages 1 and 8 in 322 with the bit pattern shown in FIG. 1. The numbered stages 1 through 5 are reserved for five alphanumeric characters and are individually connected in parallel to coding plugs shown as 360. These coding plugs contain conductive buses selectively arranged to energize the numbered stages in character register 322 to set such stages with a binary code. An input to the coding plug N will then cause the bits $b_l$—$b_7$ and $c$ to be set with a binary pattern corresponding to the pattern for N, shown in FIG. 1. It is contemplated that mateable terminals may be provided in the circuit so that the coding plugs may be changed to provide different characters for different receiver stations.

The character sequencer 358 is operated by sequentially setting the stages SOH, 1 to 5 and STX by a 1 bit advanced along the register. As the 1 bit passes along the stages it progressively energizes the stages associated with the leads 324, including the leads connected through decoding plugs 360. An output from the STX stage is also connected to a decode relay driver 364, which operates a decode relay 369 to produce an output indicating that the decoder has received a proper calling code.

As should now be apparent, the control mode for detection of a code is through the Exclusive-OR gate which compares the incoming code to a locally generated code, producing no output as long as a comparison is present and producing a reject and reset or error output if there is a lack of comparison with any of the bits in the code. Timing for the aforementioned comparison is synchronized with incoming data through the monostable driver 314. The logic which permits this operation and which permits the circuit 250 to reliably reject of accept incoming mark-space conditions will now be further described.

At rest the decode relay 369 is positioned in the not decode position responsive to an enabling pulse supplied from decode relay driver 364. Decode relay 369 controls the switch arm 338 at 336, in FIG. 3A. The decode relay driver 364 is also connected to be driven via lead 305 by the move driver 304. When the decode relay 369 is in the decode not position, not energized, it supplies a signal from the data output driver 296 to the Exclusive-OR gate 332 and it connects the error output from 344 to the SOH reset gate 352. If we now assume that a message of composition of FIG. 1 is received via 252, the space tone filter 260 will operate to energize the space gate 270. The 200 milliseconds pretone will cause the monostable driver 314 to generate 0 and E shift pulses which drive the bit counter 320 and the character register 322. Bit counter 320 generates a shift pulse to the character sequencer 322 after the stage numbered 8 is energized. A pulse is then routed over the lead 375 to the SOH reset stage of sequencer 358. Since the character sequencer is at that time in position SOH, the SOH code pattern will have been loaded into the character register 322. As the 200 millisecond space pretone continues the Exclusive-OR gate 332 continuously compares the incoming space signal with what has been stored in the character register 322. An error output will, therefore, be generated every 22 milliseconds since the SOH characters start with a mark bit. The error output continuously resets the bit counter 320, the character register 322 and the character sequencer 358 back to the SOH position so that the decoder circuit 250 is constantly looking for an SOH character.

After completion of pretone the first incoming character should be an SOH character. If the circuit 250 determines that an SOH character has been received (i.e., no error output for eight successive bits and comparisons), the bit counter will produce a pulse which shifts the character sequencer causing it to impulse the character register with the character related to stage number 1. In accordance with the code plug shown, which is an N plug, the character register would be loaded with a binary code of 1100111 in the stages numbered 1 through 8. This will then be compared on a bit-by-bit basis in reverse order in the Exclusive-OR with the incoming code. If there is a comparison there will be no error or reset output from 344 and a further shift pulse from 320 will drive 358 to the second position or stage. This will cause the character K to be set into register 322 followed by a further serial comparison made by 332.

When the seventh character, in this case the STX character, has been compared, the decode relay 369 will be energized to provide a decode output to various channel relay drivers to be described hereinafter. This will provide a signal output to set an alarm notifying the receiver station that it has been called or paged and that the receiver decoding equipment has successfully decoded its calling code.

Since both reset or reject and success functions are determined by the STX characters the receiver can readily be made to operate with codes of lesser characters than five by connecting the STX stage of 358 to the last stage used.

Energization of decode relay 369 also breaks the line between the data output driver 296 and the Exclusive-OR gate 332 and connects the data output driver directly to the character register via the lead shown as 370. The decode relay 369 also breaks the line from the error output gate 344 to the SOH relay gate 352. At the same time a separate contact energizes a device control output to enable post-address decoder output driver to be described hereinafter. The data output is now supplied via 340 to the post-address data load position in the character register 322. As the next data character is loaded into 322, outputs from each of the register positions *c*, $b_7$—$b_1$ of 322 will feed the post-address decoder output drivers 408, in FIG. 5 which drive a device control unit to be described.

When no-signals are present and incoming the no-signal gate 272 will start the no-signal timer and in 25 milliseconds will generate a move signal shifting the basic scanner to be described. Similarly, the no-signal timer 292 will drive the character sequencer to a reset condition by setting the stage SOH which will reset the bit counter 320 via lead 371 and the character register 322 via lead 373.

DEVICE CONTROL CIRCUIT

Figure 4:
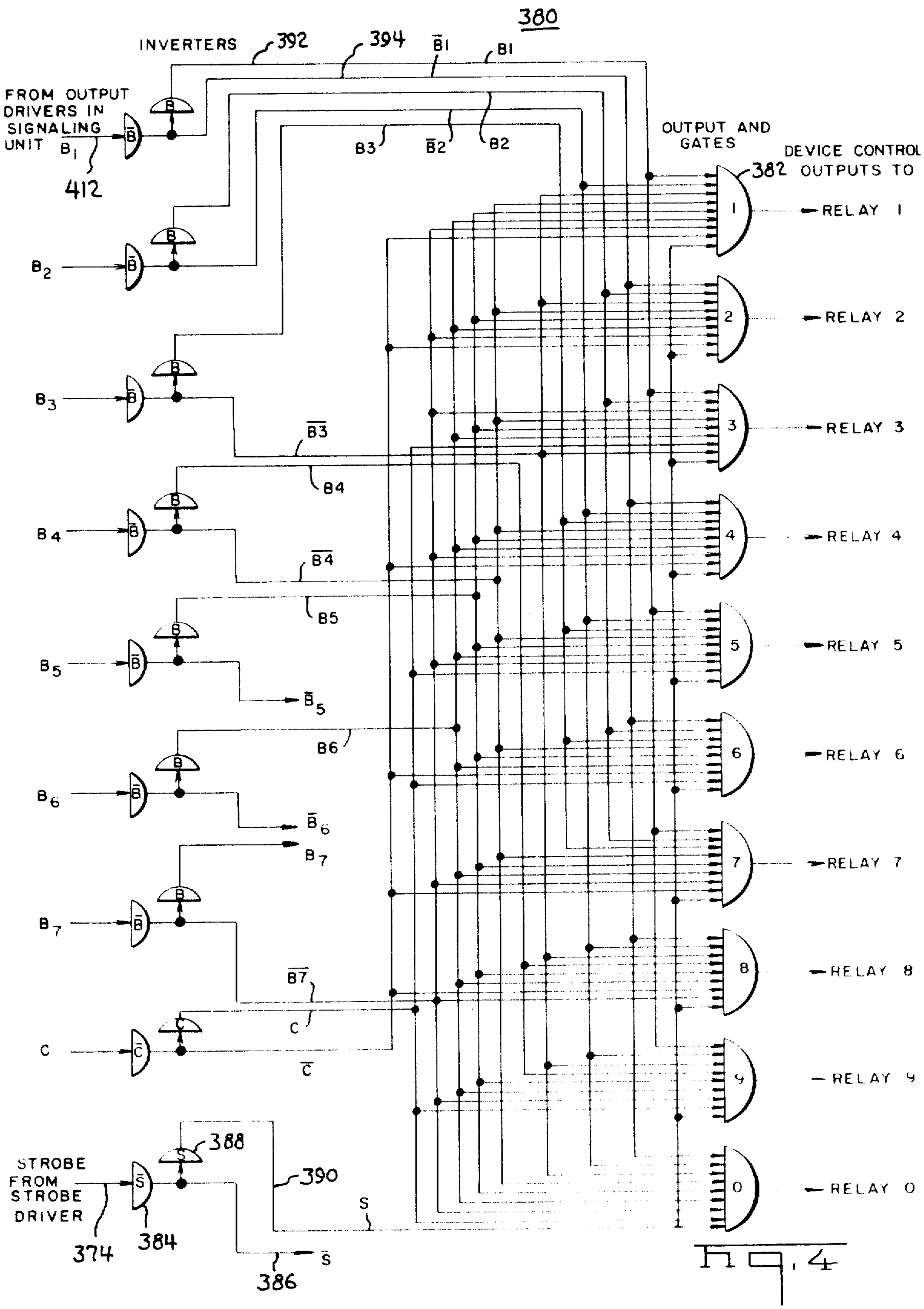
FIG. 4 is a schematic diagram showing a logic circuit for developing control signals from the receiver unit of FIGS. 3A and 3B.

Referring again to FIG. 3B, there is a connection via lead 370 from the number 8 stage of 320 to a gate 372 which serves as a strobe driver for the device control circuit 380, shown in FIG. 4. The strobe driver produces input pulses via a lead 374 to the device control unit each time a 1 bit passes through the number 8 stage of 320. The device control circuit 380 shown in FIG. 4 is an optional add-on unit for the system intended to develop a plurality of control signals for controlling auxiliary equipment at a receiver station in response to character codes. In FIG. 4, to the right, are leads which drive a plurality of relays, 1—9 and 0, which may be considered as connected to auxiliary equipment, not shown, to perform auxiliary functions. Each relay is driven by an input signal from a distinct AND gate connected thereto. The AND gates are as represented by the number 1 AND gate 382. Each AND gate has eight inputs associated with the character bit positions here lettered $B_1$—$B_7$ and C and a ninth input from the strobe driver lead 374. The strobe driver input supplies an inverter gate 384 to provide a $\bar{S}$ signal on lead 386 and an inverter gate 388 to provide an S signal on a lead 390. The $\bar{S}$ signal as well as the $\bar{B}_5$, $\bar{B}_6$and $\bar{B}_7$ outputs may be used relative to developing other alphanumeric code control signals. The inverter 388 produces an output on 390 to all of the AND gates whenever there is an input from the strobe driver on lead 374.

The remaining bit inputs to the device control unit 380 are similarly arranges with inverters to develop a pair of signals. For example, an input on $B_1$ produces a B input on the lead 392 and a $\bar{B}$ input on lead 394 when there is no input to $B_1$. The pairs of leads associated with the bit inverters are connected in the matrix, as shown, to provide a logical operation of the various AND gates 382 in accordance with the bit content input to 380.

POST-ADDRESS CIRCUIT

Figures 5, 7:
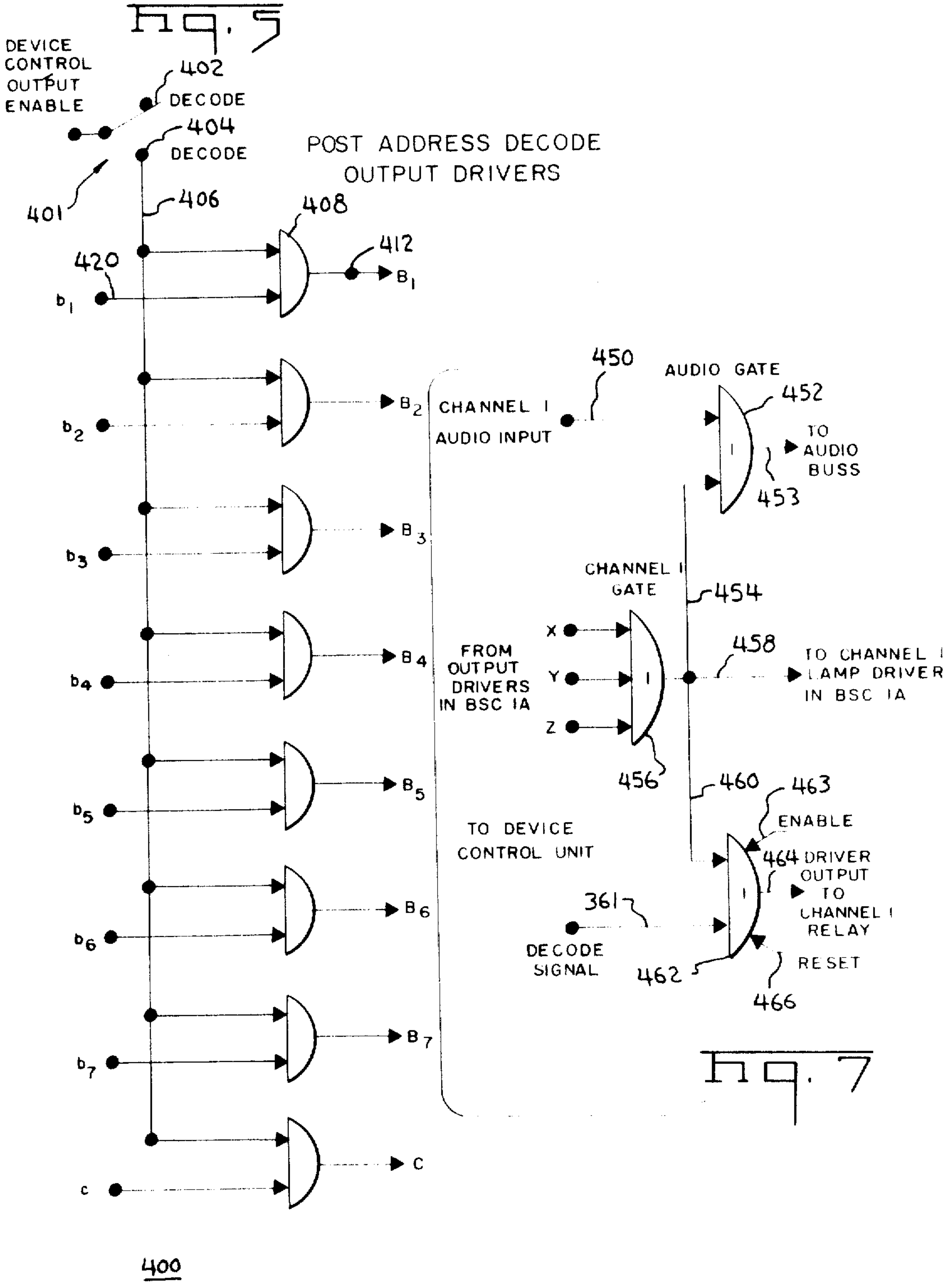
FIG. 5 is a schematic diagram of a logic circuit for developing code outputs for post-address information supplied to the receiver.
FIGS. 7, 8 and 9 are schematic diagrams of logic circuits which form part of the channel gating portion of the scanner of the system.

FIG. 5 shows a further add-on option in the form of a post-address decode circuit 400, which may be used to develop inputs to the decode control circuit from RF-type outputs generated if cores are used for the stages in the character register. A switch shown as 401 is operated by the decode relay 369 in FIG. 3B. The switch 401 includes a contact arm 402, which may be driven between two terminals, including a terminal shown as 404 connected to a lead 406 which is commoned to a series of AND gates 408. The AND gates are individually driven by leads from each of the bit positions $b_1$—$b_7$ and *c* and have outputs similarly labeled $B_1$—$B_7$ and C. When the switch 401 is caused to provide an input via 404 the various gates, such as 408, will produce DC outputs in accordance with the bit content stored in the character register.

An auxiliary lead shown as 412 is provided for auto-acknowledge purposes, to be described hereinafter.

SCANNING CIRCUIT

Figure 6:
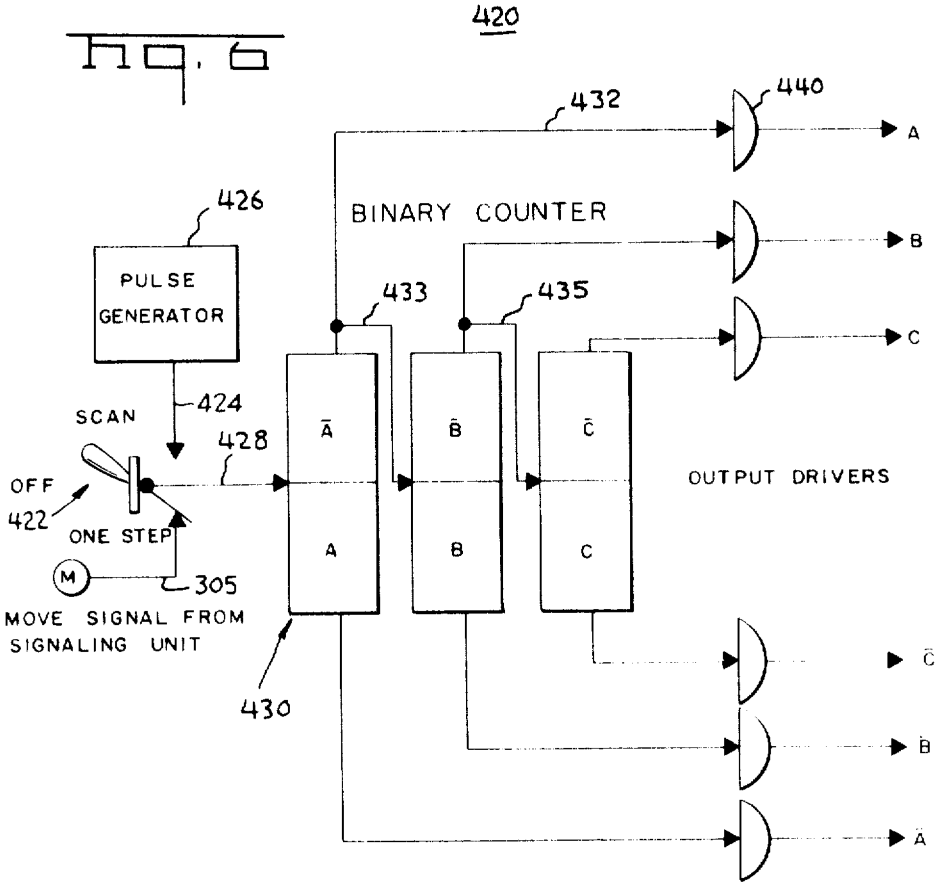
FIG. 6 is a schematic circuit diagram of a logic circuit which forms a code generating part of the scanner of the system.

Turning now to another aspect of the invention which relates to providing an automatic scanning of a number of different channels, reference is made to FIGS. 6—10. In FIG. 6 there is shown a circuit 420 capable of generating six logical control signals A—C and $\overline{A}$—$\overline{C}$, which may be combined to effect a selection of any one of eight channels providing eight parallel inputs from eight receivers, not shown, to the receiver encoder 250. The circuit 420 is inserted between the channel inputs and 250. Control for 420 is developed from the lead 305 from the move signal gate 304, shown in FIG. 3A and from a pulse generator, shown as 426. A switch 422 is connected to an output lead 424 from 426 and to a terminal connected to the lead 305. When the switch is in the position shown, signals from the move gate 304 are supplied to a lead 428. When the switch is depressed a single advance pulse is generated on lead 424 and routed to lead 428. In a center position the switch 422 is disabled. Through the use of the switch 422 the circuit 420 may be stepped one step at a time, or operated automatically.

Connected to the lead 428 is a standard three stage binary counter comprised of three flip-flops. Signals are developed from each half of each flip-flop on leads, such as 432, connected to the $\overline{A}$ half of the first flip-flop, shown as 430. The flip-flops are cross-coupled as indicated by leads 433 and 435 to provide a binary count placing different binary outputs on the various leads from the halves of the flip-flops. Each of these leads is connected to an inverter driver such as 440, which has an output to provide a logical signal as shown in FIG. 6, by the symbols A—C and $\overline{A}$—$\overline{C}$. As input pulses are provided from 422 from either the manual pulse generator 426 or from the move gate the counter is stepped to cycle through a pattern of outputs on the leads labeled A—C and $\overline{A}$—$\overline{C}$.

Figure 8:
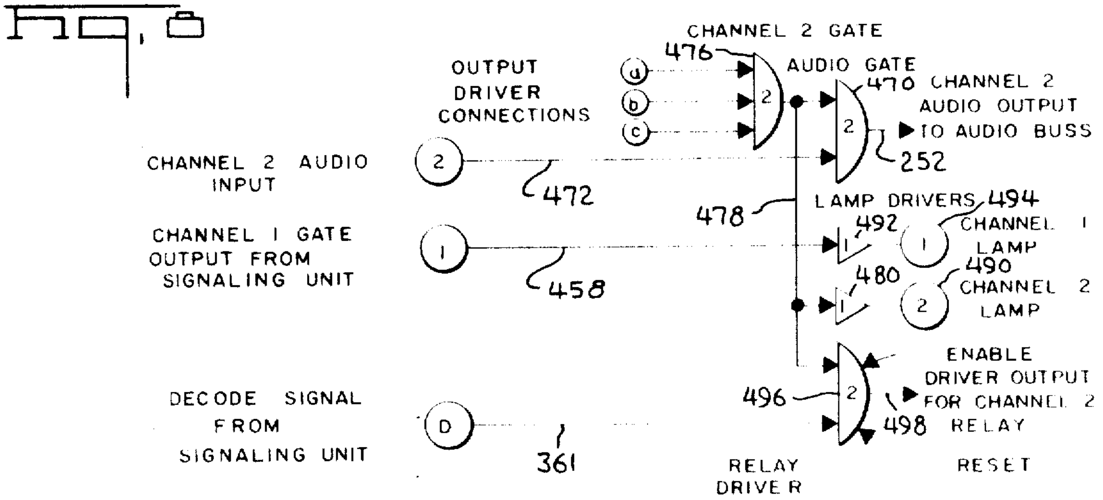
Figure 9:
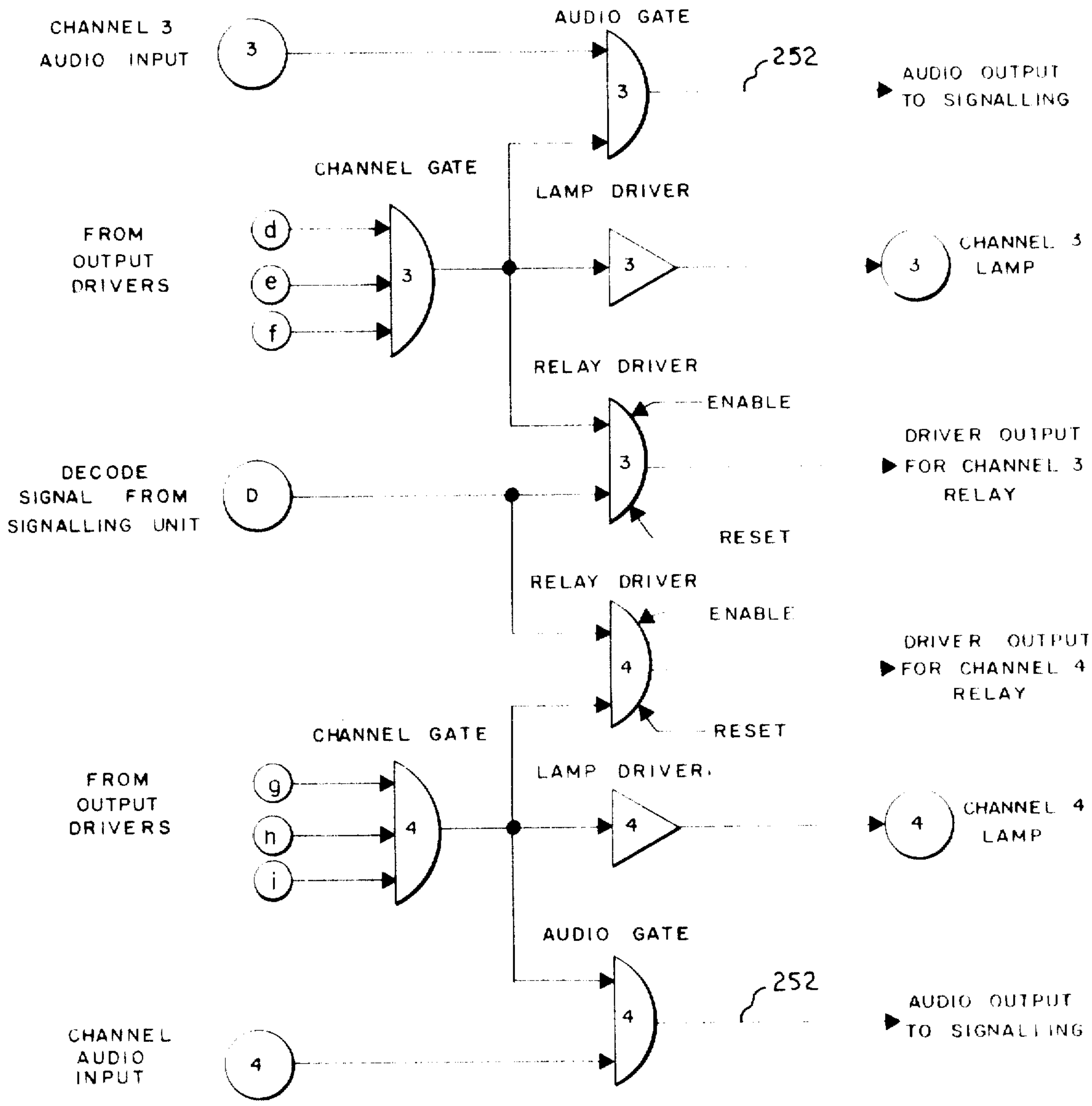

The outputs from 420 are connected to logic circuits which operate to selectively connect a given receiver associated with a given channel to the input audiobus 252 of the receiver decoder circuit 250, shown in FIGS. 3A and 3B. This logic is arranged in a manner to permit an adding on of modules to accommodate two, four, six or eight receiver channels. FIGS. 7 and 8 show the logic modules required to accommodate two channels which would normally be carried in a unit which could be plugged into the chassis of the receiver of the equipment to be interconnected to 420 and the outputs thereof. FIG. 9 shows an add-on logic module to accommodate two additional channels numbered 3 and 4. In accordance with the invention there would be two more add-on modules like that shown in FIG. 9 to accommodate additional channels 5 and 6, and 7 and 8.

The inputs to drive logic modules for eight channels would be supplied from the lettered outputs A—C and $\overline{A}$—$\overline{C}$ in circuit 420 with interconnections made to the various add-on channels through the inputs *x*—*z*, *a*—*c*, *d*—*f* and *g*—*i*, as shown in FIG. 10. The schedule in FIG. 10 identifies the channel numbers to the left, the channel capacity at the top and, in coordinate fashion, the program of interconnections from the lead outputs of 420 to the various inputs of the add-on modules. At the bottom of FIG. 10 the number of scans and dwell time per scan for different numbers of channels is shown.

Referring now to FIG. 7, the receiver associated with channel number 1 provides an input via a lead 450 to an audio AND gate 452 which has its output connected to the audiobus of 252 of the receiver decoder circuit shown in FIGS. 3A and 3B. Also connected as an input to 452, and necessary to provide the connection from the channel 1 audio input to the audiobus is a logical input developed on a lead shown as 454 from an AND gate 456. This AND gate has three possible inputs *x*, *y* and *z*, mentioned above. The inputs *x*, *y* and *z* are connected to the outputs of 420 in FIG. 6, in accordance with the schedule shown in FIG. 10. The gate 456 has a further output, shown as 458, which leads to a channel 1 lamp driver to indicate that the scanner is on channel 1. A third output from 456 is provided on a lead identified as 460, to a gate shown as 462. This gate has an input from the decode relay 369 over the lead 361, also shown in the circuit 250 in FIGS. 3A and 3B. There is also provided an output shown as 464 to the driver output for a channel number 1 relay, which operates to connect other equipment associated with the use of channel number 1. Manual enable and manual reset inputs shown as 463 and 466 are provided to permit manual operation of the scanning equipment.

In FIG. 8 the logic circuit is shown for channel number 2. The channel number 2 logic is substantially identical to that for channel number 1 to include an audio gate 470 having an output connected to the audio bus 252 in parallel with the connection from channel number 1. The audio gate 470 is driven by an input from the receiver associated with channel number 2, shown as lead 472 and by an input shown as 474 from a channel number 2 gate connected to the three inputs *a*, *b* and *c*. These inputs are also connected to the outputs of the circuit 420 shown in FIG. 6, in accordance with the pattern of connections shown in FIG. 10. The output from the channel gate 476 is also connected by a lead 478 to a lamp driver 480 for channel number 2, which drives a lamp 490. The lamp input from channel number 1 on lead 458 is connected to a lamp driver 492 to drive the channel number 1 lamp 494. A lead 478 is connected to a relay driver 496, which has an output on lead 498 connected to drive a channel number 2 relay for the purposes heretofore discussed relative to the relay 462 in FIG. 7. The AND gate 496 is similarly supplied by an input on lead 361 from the circuit 250.

FIG. 9 shows the logic circuit for channels 3 and 4, which is similar to that shown and discussed previously for channels 1 and 2, but with the inputs to the channel gates being shown as *d*, *e* and *f*, for channel 3, and *g*, *h*, and *i*, for channel 4. The logic for channels 5 and 6 and for channels 7 and 8 would be identical to that shown in FIG. 9 with inputs to the channel gates similarly labeled *d*, *e* and *f*, and *g*, *h*, and *i*.

Referring back to FIG. 10, the interconnections to achieve two, four, six or eight channel scanning are as shown. If, for example, there is only need for scanning two channels the connections would be from the lead labeled A in 420 to the leads labeled *x* in FIG. 7, and from the lead labeled $\overline{A}$ in 420 to the lead labeled *a* in FIG. 8.

Assuming now that the system includes eight receivers providing eight channel reception, and that the switch 422, shown in FIG. 6, is in the position indicated, the scanner circuit will automatically scan the eight channels as long as it receives an input from the move gate 304. If we assume there is no incoming code this condition will occur and the scanner circuit will continually step to scan the eight channels for the presence of a signal. If the switch moved to the center position, out of contact with the lead 305 and generator 426, the scanner circuit will stop wherever it is and lock on a particular channel. If the switch 422 is in the position connecting 426 to the lead 428, the scanner circuit will be caused to step one step. Lamps associated with the scanner circuit will show the operator which channel the scanner circuit is on at a particular time. In accordance with the embodiment given herein, the 200 millisecond pretone interval will allow the scanner circuit to pickup signalling coming on any one channel during a complete scan in time to lock on the signalling channel and permit the receiver circuit 250 to decode a subsequent address message. If the scanner circuit is setup for scanning two channels it will scan each channel four times during the pretone interval and if setup for eight channels it will scan each channel once. A variation in number of scans can be setup as indicated in FIG. 10, relative to six channels, the most frequently used channels being favored by merely providing additional terminations to 420.

If we now assume that the scanner circuit is turned on to scan the various eight channels and that a message signal comes in through a receiver, such as on channel 1, the scanner circuit will step along until channel 1 is reached. At this time the presence of a signal will effectively disable the no-signal timer in circuit 250 so that there will no longer be a move signal generated from 304 on lead 305. The scanner circuit will accordingly stop on channel 1. If we assume that the incoming message is incorrect for the particular receiver code set in circuit 250, an error output signal will be generated on 346, which will energize 304 and provide an output on 305 which will cause the scanner circuit to again start scanning. If we assume that there is, at that time, a message coming in on channel 3, the scanner will stop on channel 3. Since there is a message coming in the no-signal timer will be disabled and the circuit of 250 will attempt to decode the message. If we assume that it is a proper message the circuit 250 will produce an output to the decode relay driver 364, operating the decode relay to signal the station that it is being called. Receipt of a decode output will drive a gate like 462 in FIG. 7 to latch up the channel 1 relay and permit an ensuing conversation on channel 1, if it is desired. The scanning circuit may be made to immediately resume scanning once the channel relay has been latched.

RECEIVER INTERFACE AND AUTO-ACKNOWLEDGE

FIG. 11 shows a sample circuit 500, which is preferably included with receiver equipment to serve as an interface to the system from user equipment. There is included a mark tone oscillator 502 capable of producing a 2,375 hertz output and a space tone oscillator 504 capable of producing a 1,525 hertz output. The outputs from 502 and 504 are carried to contacts via leads 506 and 508 to a relay 510. The relay arm 512 is connected to an output shown as 514 which may be utilized to develop signals in a form compatible with the system of the invention for rebroadcast and the like. The relay coil 516 is connected to a terminal such as 518, which may be driven by any suitable device to selectively drive the contact 512 to engage the leads 506 and 508 and to produce a mark-space tone output on 514. In this way, the receiver unit of the system of the invention may be made compatible with almost any kind of equipment capable of generating binary signals.

Figure 12:
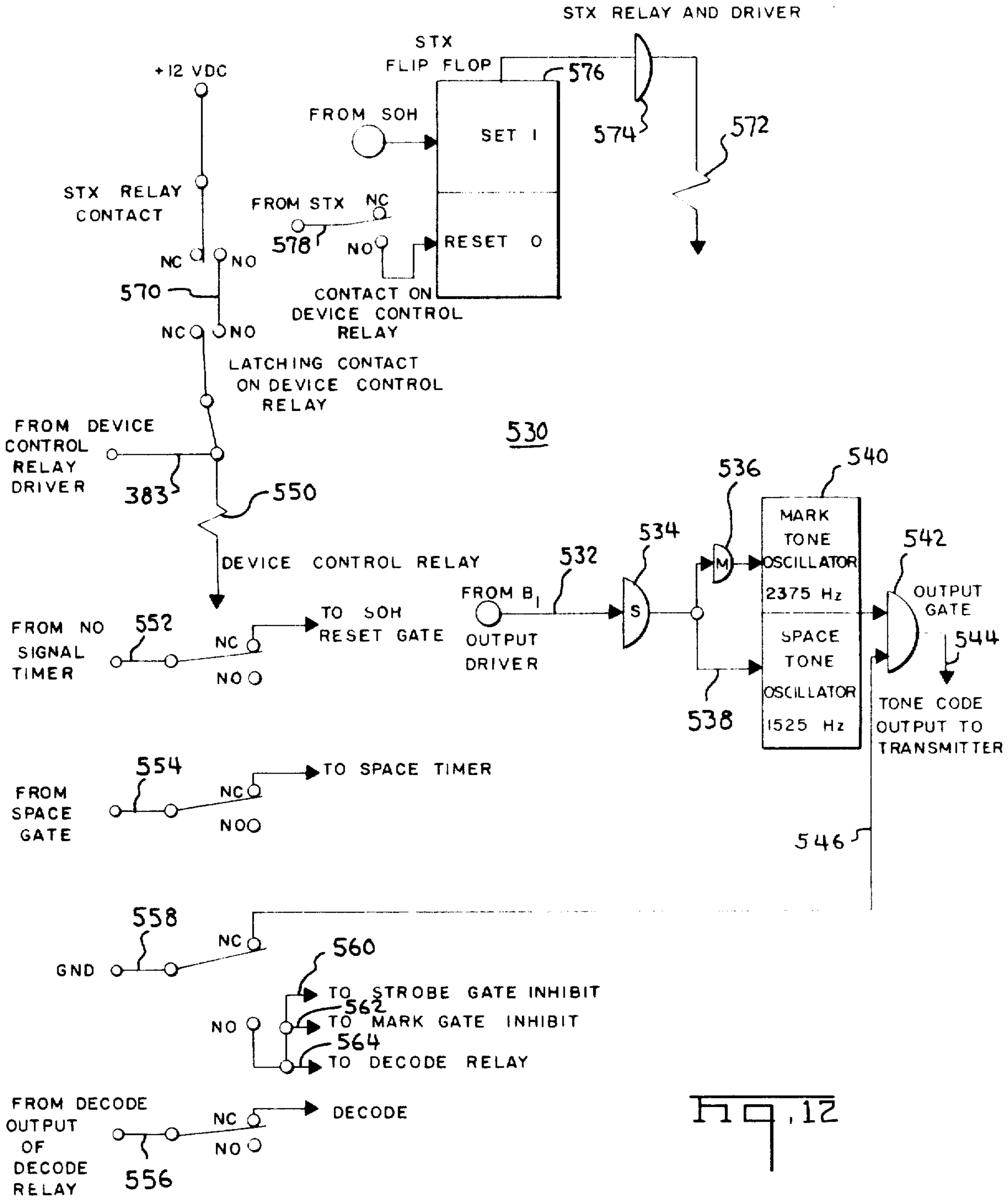
FIG. 12 is a schematic diagram of a circuit for providing an auto acknowledge call from a receiver.

FIG. 12 shows an autoacknowledge logic circuit 530, which may be provided as an optional feature in conjunction with the receiver decoder circuit 250. From a lead 532 connected to the last bit position of character register 322, an output is developed which generates the various bits $b_1$—$b_7$ and $c$ serial form. This input is supplied through a first inverter 534 and then to a parallel circuit including a second inverter 536, and a lead 538, to a pair of oscillators shown as 540. The upper oscillator is for generating the 2,375 hertz mark signal output and the lower oscillator is for generating the space tone signal of 1,525 hertz. Outputs from 540 are connected to an output gate 542, connected to an output 544, which leads to transmission equipment at a receiver station. The AND gate 542 is disabled by a lead 546, whenever such lead is connected to ground through a switch contact shown as 558.

The switch contact 558 is one of a number of switch contacts driven from an NC, normally closed, position to an NO, normally open, position by a solenoid including a coil shown as 550. The solenoid coil 550 is part of a device control relay energized from a device control relay driver over a lead 383 following a successful detection cycle in 250. Whenever 550 is operated it drives the contacts beneath the coil in FIG. 12 off of the positions shown, and it drives the lower contact associated with 570 and 578 off of the position shown. In this position a lead from the no-signal timer shown as 552 is disconnected from the SOH reset gate and a lead shown as 554 from the space gate is disconnected from the space timer. A lead from the decode relay shown as 556 is disconnected from the decode line. In the opposite condition under control of 550 the leads 552, 554 and 556 are in a normally open or unconnected position and the lead 548 is connected to ground a strobe gate inhibit lead 560, a mark gate inhibit lead 562 and a decode relay lead 564. This inhibits operation thereof.

Energization of 550 causes a connection of normally open contacts shown connected together by a lead 570 in FIG. 12, which latches 550 to the 12$^r$ DC source shown. The upper contact associated with 570 is controlled by a coil shown as 572 under drive from an STX driver shown as 574, which is operated by an STX flip-flop shown as 576. The STX flip-flop is controlled by a set input from the SOH stage in the character sequencer 358 and by an input from the STX stage in the 358. The lead from the STX stage of the character sequencer is shown as 578 through switch contacts under control of the solenoid coil 550.

When it is desired to acknowledge receipt of the call the circuit of 530 is operated through the foregoing components to connect the lead 532 to an output from the character register which is transformed into the mark and space tones output over lead 544. This cycle repeats until all of the characters of the receiver station have been transmitted and the STX signal resets 576 to break 570 and deenergize 550, which restores all of the leads to the NC position.

In the previous description of various system circuits, reference has been made to various gates and logic devices, flip-flops and the like. It is contemplated that one skilled in the art will be readily able to purchase or construct such devices from the functions associated therewith expressed in terms of input signals or pulses and output signals or pulses. It is contemplated that one skilled in the art can implement these various devices and components in a variety of ways, including through the use of transistors, magnetic cores, SCR's and other standard components.

It should also be understood that the foregoing description teaches embodiments which are jointly and serially useful, depending upon application requirements.

Having now described the invention in terms intended to enable a preferred mode of practice, we define it through the appended claims:

We claim:

1. In a system for selective signalling, input means including a keyboard operable for selectively generating a binary bit representation of one of a plurality of alphanumeric characters forming a calling address code, first bistable storage means responsive to said input means capable of being set into a stable condition to store said generated bits in series for forming a calling address code message in conjunction with other selector characters and logic means connected to said first storage means for effecting a serial output of the stored bits for transmission and simultaneously routing of said stored bits back into said first storage means, send means operable to initiate said logic means to effect said transmission, said logic means including a separate second storage means for storing an indication of the number of characters in a message and automatically operable to position the routed bits in said first storage means for retransmission, permitting transmission of an address code message any number of times and permitting transmission of messages of variable character composition and character number.

2. The system of claim 1 further including delay means responsive to said send means for providing a controlled interval prior to output of the first of plural bits representing a first character of said calling address code message and means for generating a nonmessage calling character in binary bit form during said interval for operating receiver equipment preparatory to reception of said message.

3. The system of claim 1 including indicating means operable in response to the storage of said bits in said first storage means for indicating which bit representation of characters of a certain predetermined number of bit representations of characters is stored preparatory to transmission.

4. The system of claim 1 including a driver for advancing said bits representing characters serially along said first storage means, means for gating said driver on after the input of a character into said first storage means and means responsive to a predetermined condition in said separate second storage means which in turn is responsive to said first storage means to gate said driver off.

5. In a system for selective signalling, input means including a keyboard generating any one of a plurality of characters, each formed of a pattern of binary bits, a data register including a plurality of bistable stages connected for serial transfer of characters, a first group of said stages connected to said input means to be simultaneously set by a pattern of bits to form a character in said data register, a character register including a plurality of bistable stages connected for serial transfer with a binary bit stored in only one of said stages, means connected to drive said data register and said character register for advancing characters from stage-to-stage in said data register to form a stored message and including means for advancing said bit in said character register to indicate the number of characters in said data register, and means for energizing said drive means to effect an output of said characters from said data register for transmission, the character register being reset simultaneously with said output of said characters to indicate a zero character count.

6. The system of claim 5 wherein said character register includes plural stages, each with an output terminal, with an output from one of said stages provided by the presence of a bit in said one of said stages indicative of the number of characters stored in said data register.

7. The system of claim 5 wherein there is included memory register means including a plurality of bistable stages connected for transfer of a binary bit stored therein, said memory register means having an input connection from the stages of said character register to store the character count therein, logic means responsive to a predetermined condition of said memory register for controlling said driver means to effect a drive to advance the characters forming the transmitted message into a proper position in said data register in accordance with message length and means for feeding said message back into said data register as the message is being output for transmission.

8. An encoder for generating codes comprised of a series of binary bits forming characters, comprising input means generating a group of bits as a pattern forming a character, a data register including a plurality of serially coupled stages, each stage containing a plurality of bit storage elements to store a single character one of said stages being connected to said input means for receiving a character input, driver means for advancing characters set into said one stage along said data register, a character register having a bit storage element for a majority of the stages in the data register, an output from each said element being energized by introduction of a binary bit therein which is advanced along said character register under drive from said drive means, said output serving to simultaneously provide an indication of the number of characters stored in said data register and including means through a connection to said driver for providing an automatic advance of characters to permit serial loading of characters in said data register.

9. In a selective signalling system, a calling station including an encoder having means to selectively provide input of any one of a predetermined plurality of characters in the form of binary bits, register means including binary bit positions connected for serial transfer, drive means to drive said register means to create an output of said bits and means to convert said binary bits into mark and space pulses of a given time duration, a plurality of called stations each having a receiver including a decoder having different characteristics of response relative to different messages formed of characters, each said receiver including a further register means having bit positions in number equal to the number of bits in a given character, means to stop said further register, means to decode a series of distinct characters one character at a time in said further register when said further register is stopped and means for producing an output at a receiver only if all characters of a given transmitted message are successfully decoded so as to provide an indication of call only at stations uniquely associated with the given message.

10. In a selective signalling system, an encoder operable to generate a series of time defined characters as a calling message code and a receiver adapted to receive said message, said receiver including decoder means to decode one character at a time and means to successively set said decoder means for each of a series of characters to be decoded, means to disable said decoder means in the event that a given character is not decoded within the time definition for a character, to reset said receiver and block an indication of call, and indication means responsive to a successful decoding of all characters in a calling message to provide an output indicating that the receiver is being called.

11. The system of claim 10 wherein said system further includes a plurality of receiver channels wherein said encoder time defined characters are mark and space signals and said receiver includes a plurality of timers which sense the presence of a mark signal or a space signal and means responsive to said timers for developing control signals in the event the presence of such signals exceed a predetermined time duration, said receiver further including channel scanning means responsive to said control signals for causing said scanning means to step to a different one of said channels.

12. The system of claim 11 wherein said receiver includes a further timer operable in response to the absence of either mark or space signals to develop a series of control pulses for operating said scanning means at said receiver station.

13. In an apparatus for scanning a plurality of different receiver channels, a receiver including means to sense the presence or absence of a distinct message format signal for given periods of time and operable to produce first and second control signals, respectively, in response to said sensing, channel scanning means including a series of gates each having a different channel input and an output connected to said receiver, channel stepping means responsive to said second signal for sequentially operate said gates to cause said receiver to look for a signal input and including means responsive to said second signal for holding the gate then operated closed to provide a continuous input to said receiver, said receiver including means operable in response to a given message format to produce a third signal for inhibiting said channel stepping means indefinitely from sequentially operating said gates and including means operable in response to the message format for produce a fourth signal causing said channel stepping means to again sequentially operate said gates.

14. The system of claim 13 wherein said channel stepping means is a binary counter operable to generate a binary code and there is included a logic circuit having outputs to said gates and responsive to said code to selectively operate said gates.